United States Patent [19]
Hendrickson

[11] 3,792,545
[45] Feb. 19, 1974

[54] LURE RETRIEVER

[76] Inventor: Walter R. Hendrickson, 2265 E. Orange Grove, Pasadena, Calif. 91104

[22] Filed: Apr. 17, 1973

[21] Appl. No.: 352,065

[52] U.S. Cl. ................................................ 43/17.2
[51] Int. Cl. ............................................ A01k 97/00
[58] Field of Search ...................................... 43/17.2

[56] References Cited
UNITED STATES PATENTS

| | | | |
|---|---|---|---|
| 2,560,723 | 7/1951 | Hansen | 43/17.2 |
| 2,826,849 | 3/1958 | Frederick | 43/17.2 |
| 2,906,050 | 9/1959 | Foster et al. | 43/17.2 |

Primary Examiner—Louis G. Mancene
Assistant Examiner—Daniel J. Leach
Attorney, Agent, or Firm—Sellers and Brace

[57] ABSTRACT

A lure retriever having a notched leading end supporting a sliding loop cooperating to hold the retriever loosely assembled to a snagged fishing line until the retriever is engaged over the lure. Thereafter, the retriever draft line is operable to retract the sliding loop to lock the retriever to the lure while the draft line is used to free the lure and haul it home.

12 Claims, 6 Drawing Figures

PATENTED FEB 19 1974 3,792,545
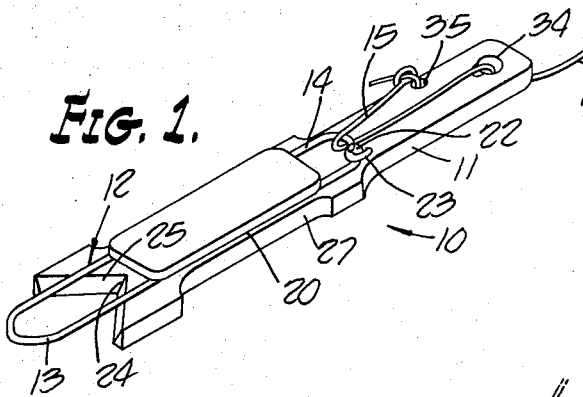
FIG. 1.
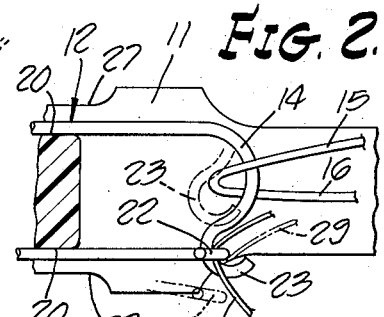
FIG. 2.
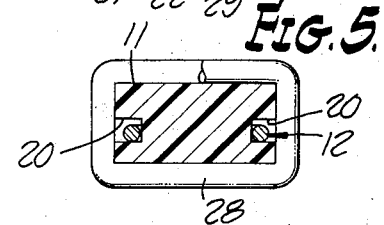
FIG. 5.
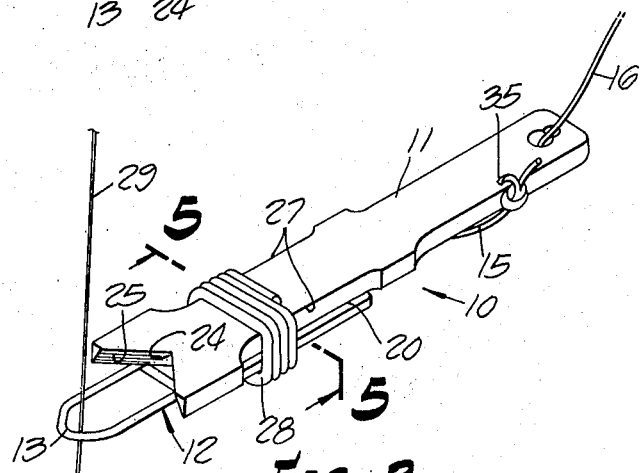
FIG. 3.
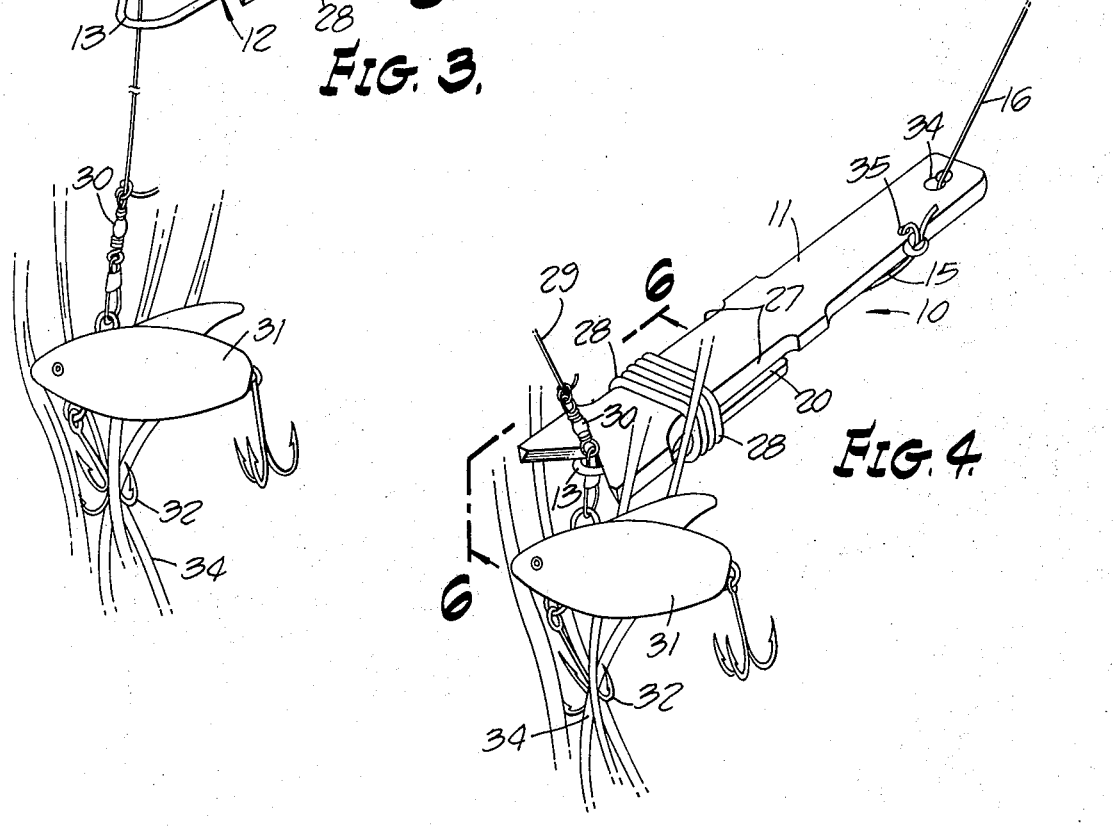
FIG. 6.
FIG. 4.

LURE RETRIEVER

This invention relates to fishline lure retrievers, and more particularly to an improved device of a unique rugged construction having improved means holding the retriever positively locked to the lure while a heavy duty draft line is used to free the snagged lure and haul it from the water.

Not infrequently fishermen are confronted with the frustrating experience of trying to recover a snagged fishing lure but succeed only in damage to their equipment and loss of the lure and some if not a major portion of the line. Various proposals have been made for retriever devices slidable along the line until engaging the lure and then utilizing a hauling line attached to the retrieving device to free the lure without need for tensioning the fishline proper. Some of these devices can be used with success under a limited range of conditions or under certain ideal conditions but without success in many other conditions likely to be encountered in actual practice. For example, some of these devices utilize pivoting jaw-like components which open scissors-fashion during operation and then can be closed to lock them to the lure with the result that the jaw portions can become entangled with underwater plant growth, submerged debris, limbs and the like with the likelihood that both the lure and retriever must be abandoned. Other retrievers are designed with a hook and cooperating components intended to permit the hook to be threaded through an eyelet forming part of the lure swivel assembly. The successful operation of this type of retriever is dependent upon proper manipulation of the retriever, the absence of debris and plant growth in the vicinity of the snagged lure, the visibility of the parts during hookup with the lure, the distance of the retriever and lure from the fisherman, and other factors all of which vary widely in actual practice.

The present invention is designed to avoid the foregoing and other uncertainties and shortcomings of prior retrievers and to provide an improved retriever which is quickly and easily adaptable to widely varying conditions including, in particular, the submerged depth of the snagged lure. Typically, the retriever comprises an elongated strip-like main body grooved along the lateral edges of its leading end. An elongated capture loop is loosely and slidably supported in these grooves and lengthwise of the notched end of the retriever body. A high strength draft line has its leading end threaded through the trailing end of the sliding loop and so arranged as to shift the capture loop to its retracted position wherein the fishing line and its swivel connection with the lure is positively and immovably trapped in the notched end of the retriever. Tension applied to the draft line then retains the lure captive while applying sufficient force to disengage it from its snagged condition. The retriever can be adjusted for use in water of any depth by the simple expedient of wrapping its leading end with the desired number of convolutions of lead wire or the like weighting material. The capture loop preferably comprises a split ring having overlapping hooked ends. The fishline is readily threaded between these overlapped ends and along one edge of the grooved main body until it is properly threaded through the leading end of the capture loop. This expedient permits making the capture loop of very strong spring stock without interfering with the ease with which a snagged fishing line can be threaded onto the retriever.

Accordingly it is a primary object of the present invention to provide an improved, rugged, highly-reliable, lure retriever usable under widely varying conditions.

Another object of the invention is the provision of an improved lure retriever having two principal parts including a lure capture loop slidably supported lengthwise of the retriever main body and under the control of the retriever draft line.

Another object of the invention is the provision of a versatile lure retriever usable to recover snagged lures under widely varying submerged depths and having a readily adjustable weight readily attachable to the leading end of the retriever.

Another object of the invention is the provision of a simple, rugged lure retriever free of parts which can become snagged on or interlocked with submerged objects but which is readily manipulatable to interlock with a snagged lure after being guided into position thereagainst.

These and other more specific objects will appear upon reading the following specification and claims and upon considering in connection therewith the attached drawing to which they relate.

Referring now to the drawing in which a preferred embodiment of the invention is illustrated:

FIG. 1 is a perspective view of an illustrative embodiment of the invention retriever with the capture loop in its extended position;

FIG. 2 is a fragmentary plan view of the trailing end of the capture loop showing a fishing line in the process of being threaded into the capture loop, the full line showing of the fishing line representing an initial position and the dotted line showing of the line representing a later stage of the threading operation;

FIG. 3 is a perspective view of the retriever while being lowered along a snagged fishing line and as it approaches the snagged lure;

FIG. 4 is a view similar to FIG. 3 but showing the retriever locked to the lure;

FIG. 5 is a cross-sectional view on an enlarged scale taken along line 5—5 on FIG. 3; and FIG. 6 is a fragmentary cross-sectional view taken longitudinally of the forward end of the notch in the main body indicated by line 6—6 on FIG. 4.

Referring initially more particularly to FIG. 1, there is shown one preferred embodiment of the invention retriever, designated generally 10, having an elongated main body 11 molded from a suitable tough and rigid thermoplastic material or other suitable material. Slidably supported in grooves in lateral edges of the main body is an elongated split loop 12 of stiff spring stock hereinafter called a capture loop. This loop has a V-shaped leading end 13 and a trailing end 14 through which the adjacent end 15 of a heavy-duty draft line 16 is looped and then anchored to a hole 35 near the trailing end of main body 11 thereby providing a mechanical advantage of two to one.

Referring to FIGS. 2 and 5 in particular, it will be noted that the opposite lateral edges of main body 11 are provided with a pair of outwardly opening grooves 20,20 in which the parallel opposite sides of loop 12 have a loose sliding fit. Grooves 20 have a width substantially greater than the cross-sectional diameter of the capture loop 12 for a purpose which will become apparent presently.

FIGS. 1 and 2 show the ends of the capture loop 12 as located in one corner of its trailing end 14. Each of these ends is formed with an interlooped hooked end 22,23. Normally hooked ends 22,23 are in positive but resilient engagement with one another. However, they may be disengaged if desired as when assembling or disassembling the capture loop 12 from grooves 20,20.

The leading end of main body 11 is deeply notched at 24 with the inner end of the notch centered crosswise of the end of the main body. Additionally, the sides of the V-notch are preferably beveled outwardly and rearwardly from the top face of the main body as viewed in FIG. 3. The opposite lateral edges of the main body are recessed at 27 to provide a radially flanged area about which a suitable length of weighting material may be wrapped. Such material conveniently comprises lead wire 28 of a type customarily used by fishermen to weight their fishing lines or other gear. One or more convolutions of this lead weight can be wrapped about the retriever and adjusted to any position lengthwise of the recesses 27 found most effective under a particular operating condition.

The fishing line is indicated at 29 in FIG. 3 and is there shown attached to the usual swivel device 30 having its remote end connected to a typical lure indicated at 31. One of the lure hooks 32 is there shown snagged on some submerged undergrowth 34.

To retrieve the snagged object 31, the fisherman either threads a non-submerged length of the line to the capture loop 12 in the manner best shown in FIG. 2 or unsnaps hooks 22,23 to admit the line. A length of line 29 is inserted beneath hook 22 of the capture loop following which the portion of line 29 immediately below hook 22 is pulled back to the dotted line position. Tension is then applied to both legs of line 29 as it is manipulated and pulled between the normally contacting portions of hooks 22,23 until it has been moved to the left past hook 22. Thereafter, the loop of fishing line 29 is pulled lengthwise of the capture loop 12 along groove 20 in the main body until this loop of the fishing line reaches its fully threaded position at the leading end 13 of the capture loop.

The retriever then being threaded to the line in the manner shown in FIG. 3, the retriever with the capture loop 12 in its extended position is allowed to slide downwardly along the fishing line until loop 13 rests against the top side of lure 31 in the manner best shown in FIG. 4. The operator now applies tension to the draft line 16, the leading end of which line is tensioned and capture loop 12 is shifted rearwardly to its fully retracted position with the leading end 13 of the loop clamping swivel device 30 positively at the inner beveled end of notch 24, the lure remaining powerfully gripped in this position so long as tension is maintained on draft line 16. The fisherman may now manipulate the draft line as necessary to disengage it from the snagged position and retreive the lure.

Disassembly of the recovered lure is accomplished quickly and readily simply by moving loop 12 to its extended position, removing weight 28 if present, and then withdrawing line 29 along one side of the capture loop and disengaging it from hooks 22,23 in the reverse order described for the threading operation. After use, the draft line is readily stored by wrapping it about the leading end of main body 11 in the area normally occupied by the convolutions of wire 28.

While the particular lure retriever herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A lure retriever comprising an elongated rigid main body having a notched leading end, capture means movably supported on said main body for movement between an extended and a retracted position, said capture means having a portion cooperating with said notch to freely receive a fishing line connected to lure means or the like when said capture means is in the extended position thereof, and a draft line interconnecting said capture means and the trailing end of said main body operable when tensioned to shift said capture means to the retracted position thereof to grip said fishing line while said draft line is being used to free a lure from engagement with an object.

2. A retriever as defined in claim 1 characterized in that said capture means is movable lengthwise of said notch and includes a loop embracing the open end of said notch cooperating with the closed end of said notch to completely encircle a fishing line after being threaded therethrough.

3. A retriever as defined in claim 2 characterized in that said capture means is movable to and fro along said main body between said retracted and said extended positions.

4. A retriever as defined in claim 1 characterized in that said notch is V-shaped at the inner end thereof.

5. A retriever as defined in claim 1 characterized in that the sidewalls at the inner end of said notch are beveled outwardly and backwardly toward the trailing end of said main body from one face thereof.

6. A retriever as defined in claim 1 characterized in the provision of means for holding a weight of a selected size captive on the leading end of said main body.

7. A retriever as defined in claim 1 characterized in that said capture means comprises a substantially closed loop of rigid resilient material extending lengthwise of the leading end of said main body, said draft line having the leading end thereof threaded through the trailing end of said capture means and then secured to said main body in an area such that the tensioning of said draft line is effective to move said capture means from the extended to the retracted position thereof with a mechanical advantage.

8. A retriever as defined in claim 7 characterized in that said capture means is a split ring having overlapping ends normally in contact and effective to retain a fishing line threaded through the leading end thereof and said draft line threaded through the trailing end thereof.

9. A retriever as defined in claim 1 characterized in that said main body includes a groove opening outwardly from either lateral edge thereof, said capture means comprising an elongated loop of resilient material slidably supported for to and fro movement lengthwise of said grooves and having overlapping ends separable sufficiently to permit threading a non-submerged portion of a fishing line therepast.

10. A retriever as defined in claim 9 characterized in the provision of means on the leading end of said main body for holding a selected length of ductile wire detachably captive thereon.

11. A retriever as defined in claim 9 characterized in that the leading end of said elongated loop is V-shaped with the apex portion thereof in longitudinal alignment with said notch and the closed inner end thereof.

12. A retriever as defined in claim 9 characterized in that the overlapped ends of elongated loop include normally engaged oppositely-facing hooked ends.

* * * * *